United States Patent
Kim et al.

(10) Patent No.: US 12,452,825 B2
(45) Date of Patent: Oct. 21, 2025

(54) METHOD AND APPARATUS FOR HEIGHT-BASED LOCATION UPDATE IN A WIRELESS COMMUNICATION SYSTEM

(71) Applicant: LG ELECTRONICS INC., Seoul (KR)

(72) Inventors: Myoungsoo Kim, Seoul (KR); Sunghoon Jung, Seoul (KR); Hongsuk Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 541 days.

(21) Appl. No.: 17/933,226

(22) Filed: Sep. 19, 2022

(65) Prior Publication Data

US 2023/0354255 A1 Nov. 2, 2023

Related U.S. Application Data

(60) Provisional application No. 63/337,179, filed on May 2, 2022.

(51) Int. Cl.
*H04W 64/00* (2009.01)
*H04W 24/02* (2009.01)

(52) U.S. Cl.
CPC ......... *H04W 64/003* (2013.01); *H04W 24/02* (2013.01)

(58) Field of Classification Search
CPC ............................ H04W 64/003; H04W 24/02
See application file for complete search history.

(56) References Cited

U.S. PATENT DOCUMENTS

2020/0077358 A1* 3/2020 Kovacs ................. H04W 4/022
2021/0022054 A1* 1/2021 Tsuda .................... H04W 60/04
2022/0330051 A1* 10/2022 Peng ................... H04W 64/006

FOREIGN PATENT DOCUMENTS

WO    WO-2021134496 A1 *  7/2021  ......... H04B 7/18504

OTHER PUBLICATIONS

3rd Generation Partnership Project, "Technical Specification Group Radio Access Network; Evolved Universal Terrestrial Radio Access (E-UTRA); Radio Resource Control (RRC); Protocol specification (Release 16)," Sections 5.3.3.4, 5.5.4.16, 5.5.4.17, 5.6.5.3, and 6.2.2 of 3GPP TS 36.331 V16.6.0, Sep. 2021, 1091 pages.
3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 16)," Section 23.17 of 3GPP TS 36.300 V16.5.0, Mar. 2021, 391 pages.

(Continued)

*Primary Examiner* — Erika A Washington
(74) *Attorney, Agent, or Firm* — LEE, HONG, DEGERMAN, KANG & WAIMEY

(57) ABSTRACT

A method and apparatus for height-based location update in a wireless communication system is provided. A wireless device receives information on one or more threshold heights between a plurality of height spans. A wireless device monitors a height of the wireless device. A wireless device initiates a tracking area update procedure based on the height of the wireless device being passed the one or more threshold heights.

14 Claims, 18 Drawing Sheets

(56) References Cited

OTHER PUBLICATIONS

3rd Generation Partnership Project, "Technical Specification Group Core Network and Terminals; Non-Access-Stratum (NAS) protocol for 5G System (5GS); Stage 3; (Release 17)," Sections 4.6 and 5.5.1.3.2 of 3GPP TS 24.501 V17.6.1, Mar. 2022, 952 pages.
3rd Generation Partnership Project, "Technical Specification Group Services and System Aspects; System architecture for the 5G System (5GS); Stage 2 (Release 17)," Section 5.15.2 of 3GPP TS 23.501 V17.4.0, Mar. 2022, 567 pages.
3rd Generation Partnership Project, "Technical Specification Group Core Network and Terminals; Non-Access-Stratum (NAS) protocol for Evolved Packet System (EPS); Stage 3 (Release 17)," Section 5.5.3 of 3GPP TS 24.301 V17.6.0, Mar. 2022, 591 pages.

* cited by examiner

METHOD AND APPARATUS FOR HEIGHT-BASED LOCATION UPDATE IN A WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application No. 63/337,179, filed on May 2, 2022, the contents of which is hereby incorporated by reference herein in its entirety.

BACKGROUND

Technical Field

The present disclosure relates to a method and apparatus for height-based location update in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

Technical Objects

In NR, the network may configure the configurations related to NAS, such as IMS, network-slice, during the registration procedure for a registration area, and most NAS parameters may be applicable for the registration area.

The UE may initiate the registration process when it needs to change some settings, such as slice(s), other than when the UE detects that the UE is entering a tracking area that is not in the list of previously registered tracking areas with AMF.

In other words, for the aerial UE, if some settings related to NAS in the UE need to be updated based on the height, the UE can perform the registration process. However, if the network needs to update the NAS configuration based on its height, there is no process to inform the network (NAS) of the height of the UE. The network may need height information to provide an aerial UE-specific service. Therefore, it is necessary to inform the network (NAS) that the height of the UE has changed.

Therefore, studies for height-based location update in a wireless communication system are required.

Technical Solutions

In an aspect, a method performed by a wireless device in a wireless communication system is provided. A wireless device receives information on one or more threshold heights between a plurality of height spans. A wireless device monitors a height of the wireless device. A wireless device initiates a tracking area update procedure based on the height of the wireless device being passed the one or more threshold heights.

In another aspect, an apparatus for implementing the above method is provided.

Technical Effects

The present disclosure can have various advantageous effects.

According to some embodiments of the present disclosure, a wireless device could efficiently perform the height-based location update.

For example, as UAV UEs are commercialized, the network will provide more diverse services exclusively for UAV UEs. Based on the height-based registration, the network can configure new NAS or AS configurations related to the height and provide UAV-specific services to the UE.

In other words, according to the present disclosure, a wireless device (for example, a UAV UE) could perform location area update according to the change in height of the wireless device.

According to some embodiments of the present disclosure, a wireless network system could provide an efficient solution for the height-based location update Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
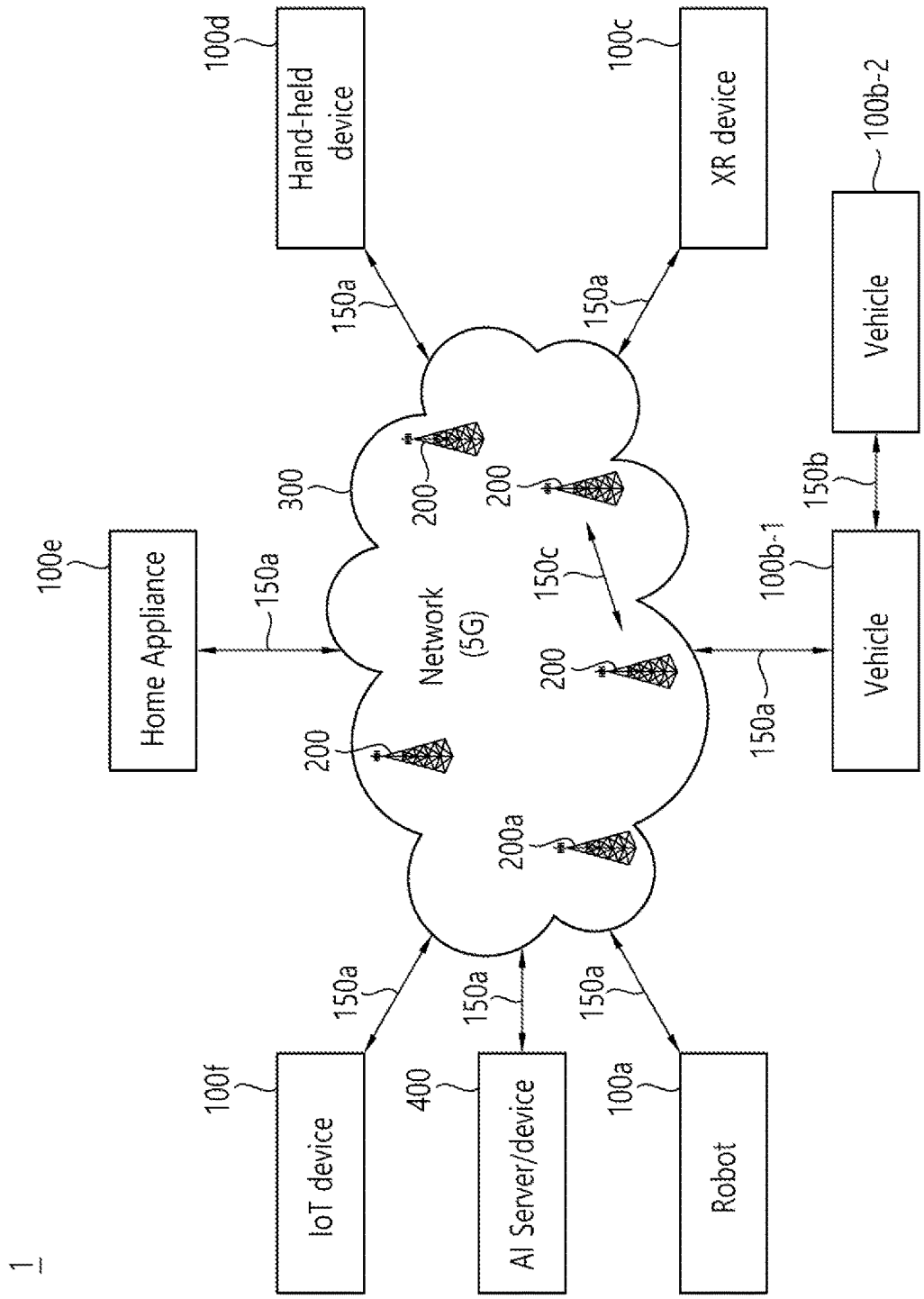
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
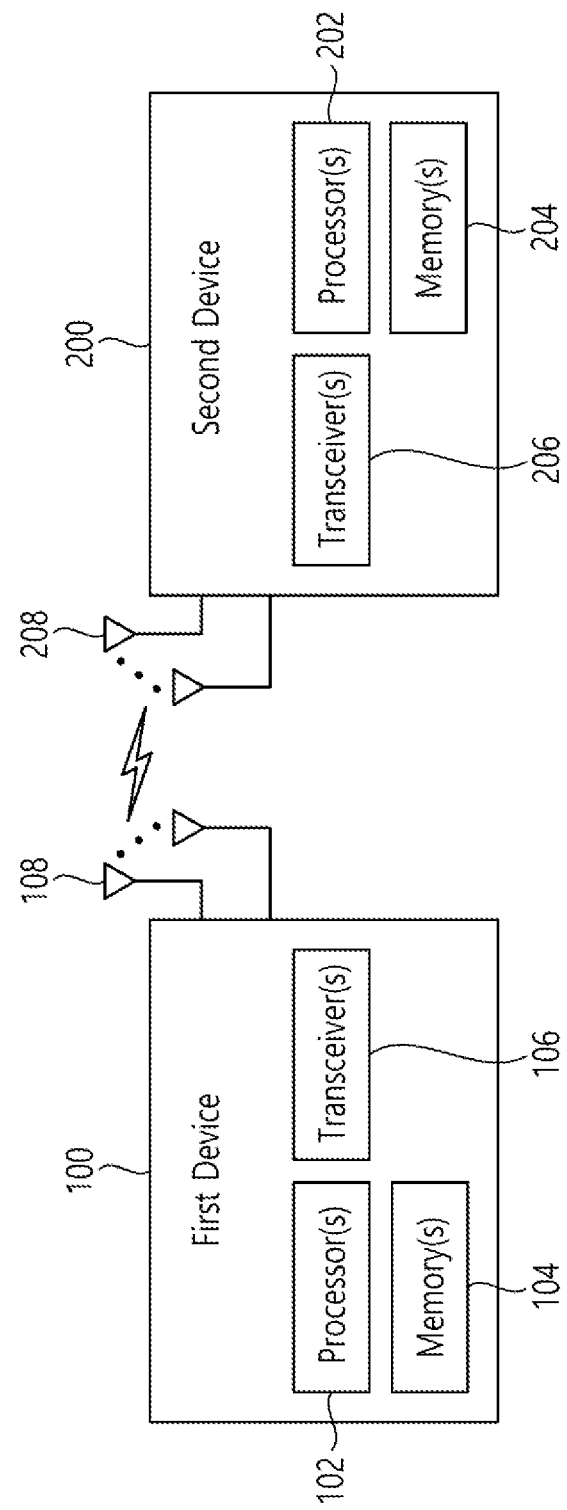
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
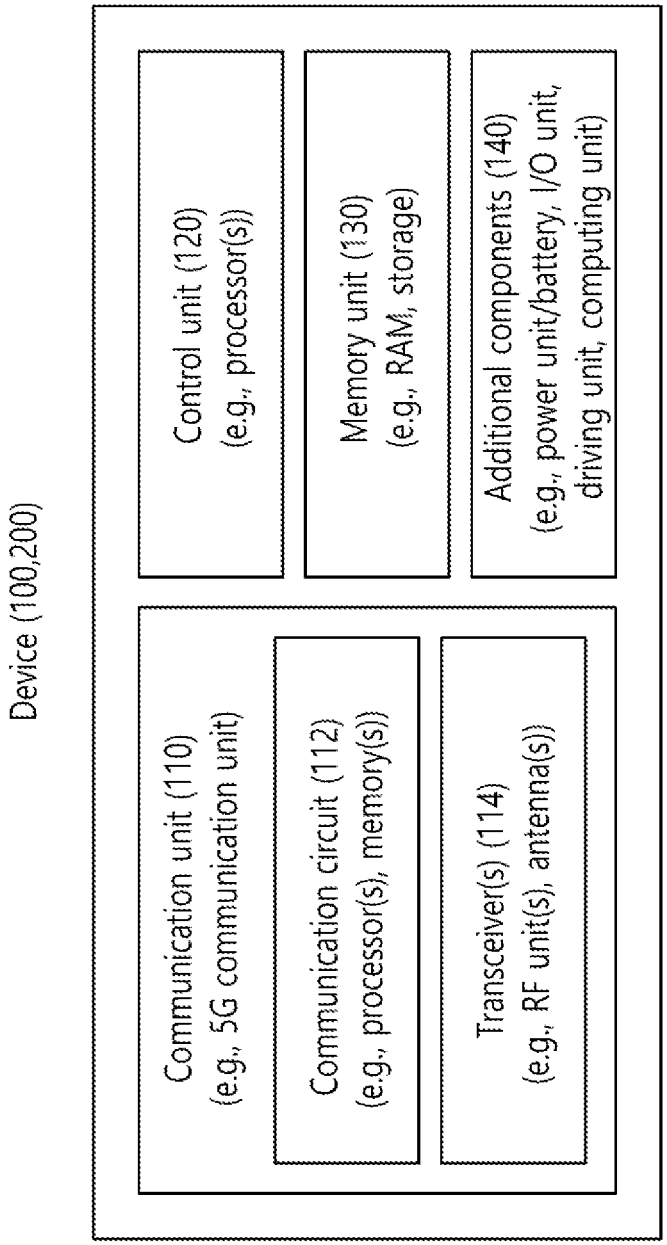
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
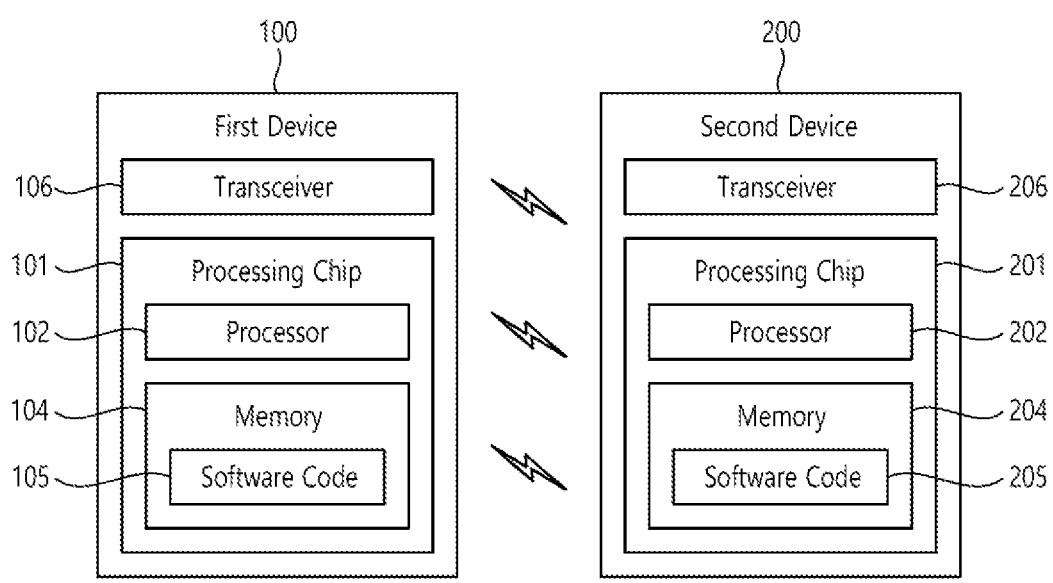
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
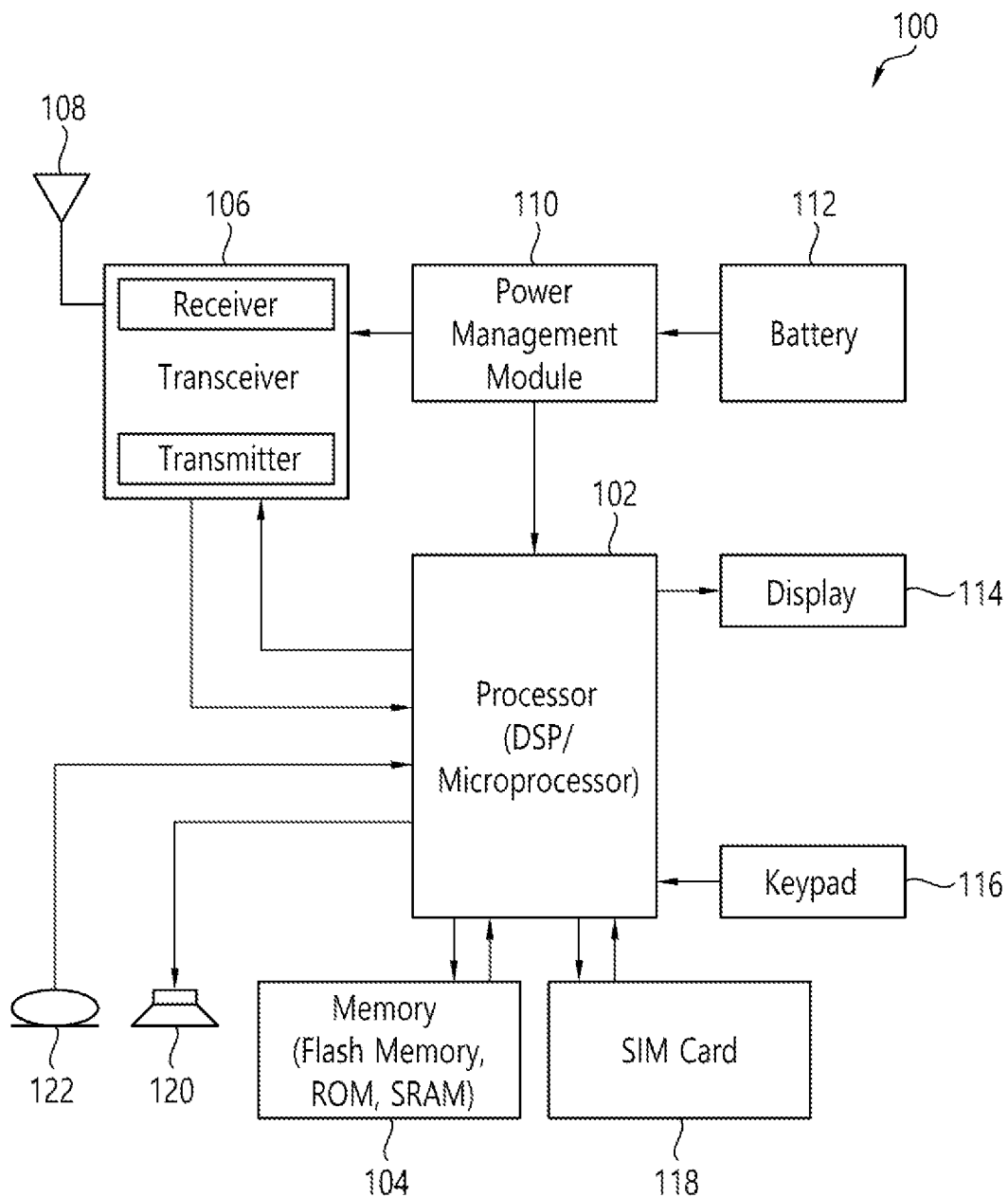
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
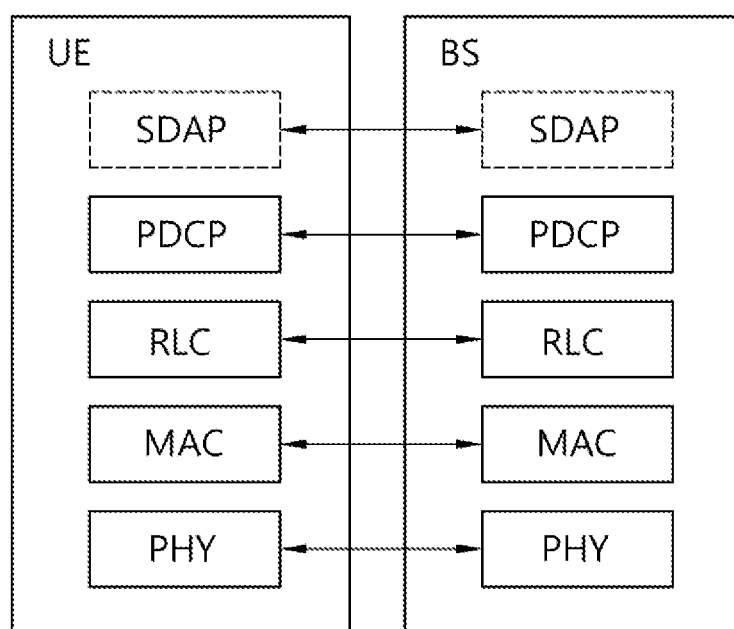
FIGS. 6 and 7 show an example of protocol stacks in a 3GPP based wireless communication system to which implementations of the present disclosure is applied.
Figure 7:
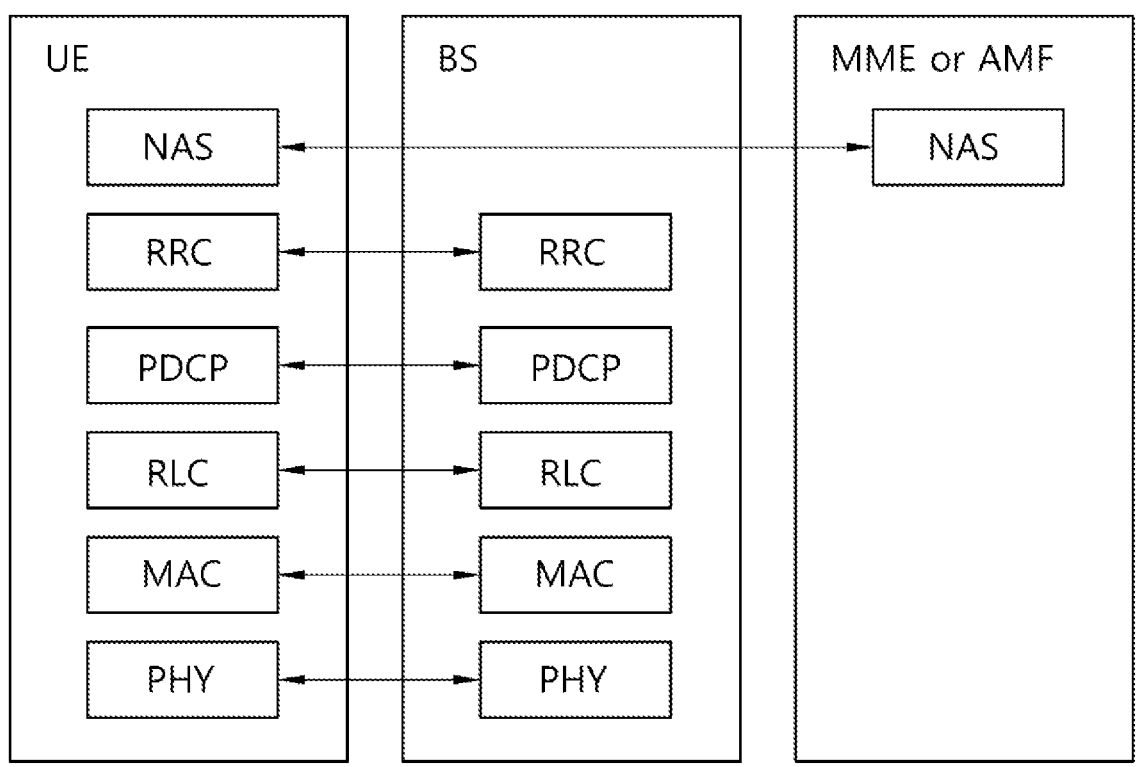

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
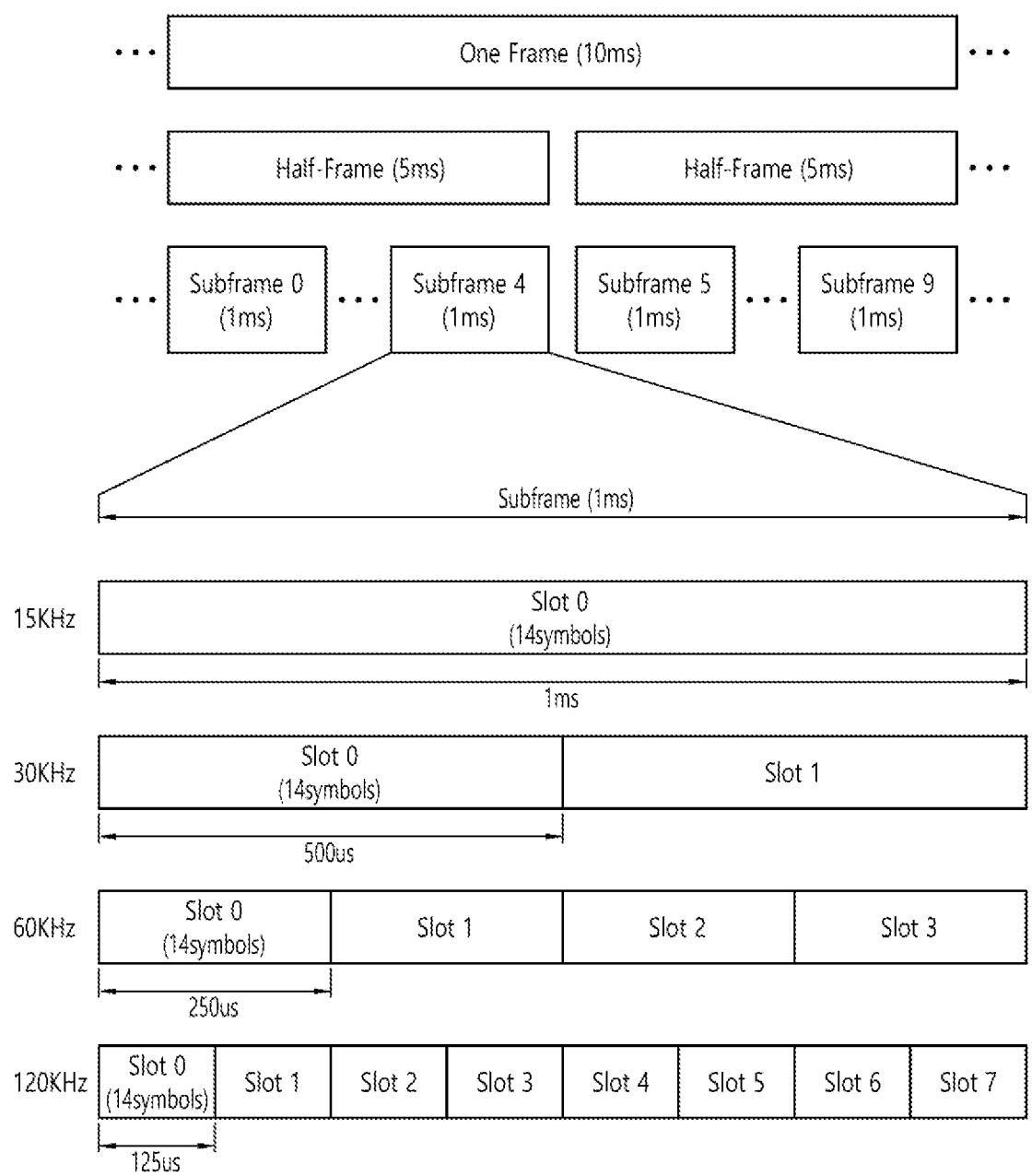
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
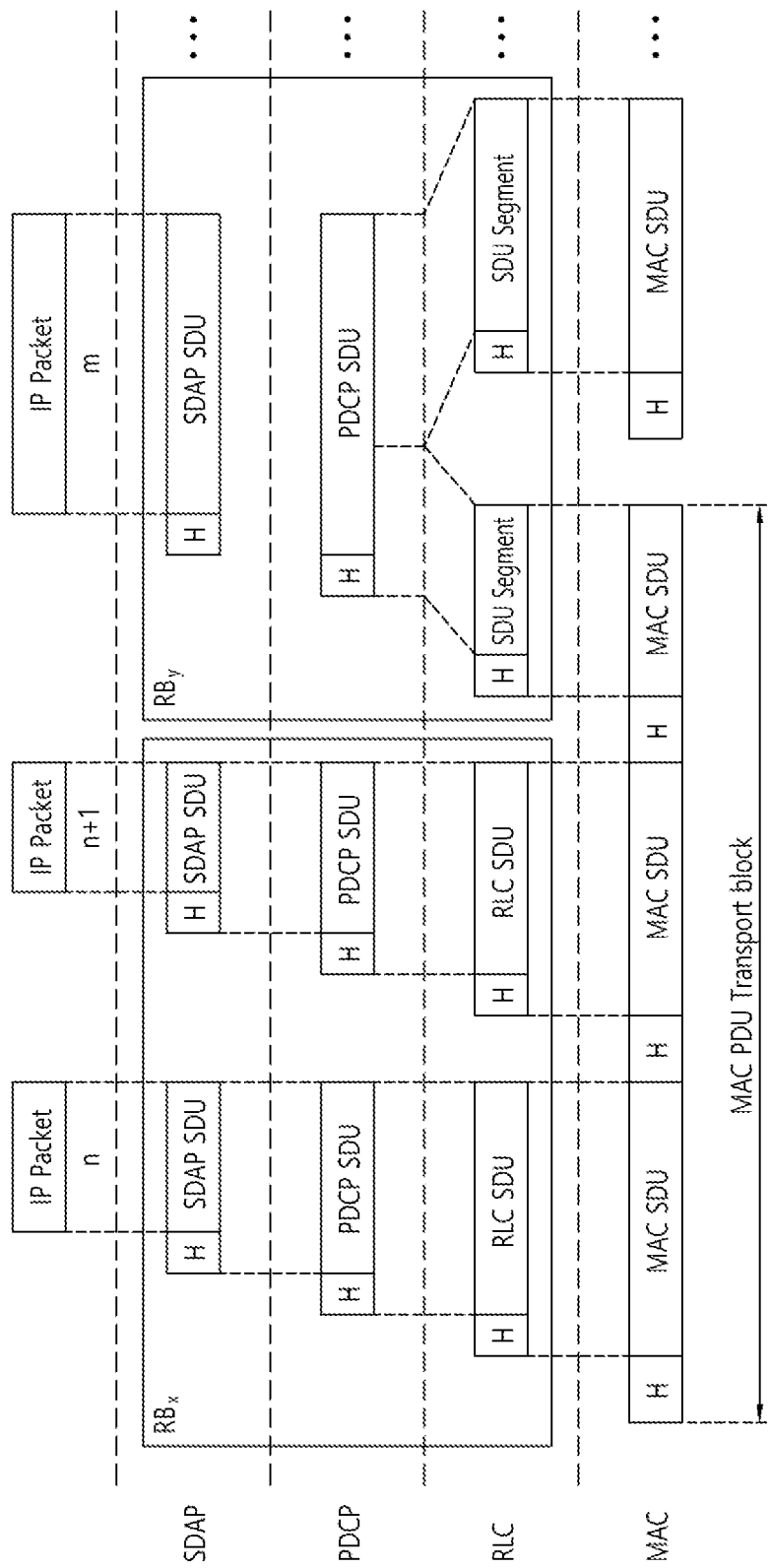
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Hereinafter, technical features related to the present disclosure are described. Parts of section 5.3.3.4, 5.5.4.16, 5.5.4.17, 5.6.5.3, and 6.2.2 of 3GPP TS 36.331 v16.6.0 may be referred.

Operations related to reception of the RRCConnectionSetup by the UE are described.

The UE shall:
1> set the content of RRCConnectionSetupComplete message as follows:
2> if the UE is connected to EPC:
3> except for NB-IoT:
4> include the mobilityState and set it to the mobility state (as specified in TS 36.304 [4]) of the UE just prior to entering RRC_CONNECTED state;
4> if the UE has flight path information available:
5> include flightPathInfoAvailable;

Operations related to reception of the UEInformationRequest message are described.

1> except for NB-IoT, if flightPathInfoReq field is present and the UE has flight path information available:
2> include the flightPathInfoReport and set it to include the list of waypoints along the flight path;
2> if the includeTimeStamp is set to TRUE:
3> set the field timeStamp to the time when UE intends to arrive to each waypoint if this information is available at the UE;

Technical features related to a UEInformationRequest message are described. The UEInformationRequest is the command used by E-UTRAN to retrieve information from the UE.

For example, signalling radio bearer for the UEInformationRequest may include SRB1. RLC-Service Access Point (SAP) for the UEInformationRequest may include AM. Logical channel for the UEInformationRequest may include DCCH. Direction for the UEInformationRequest may be E-UTRAN to UE.

The UEInformationRequest may include information on a flightPathInfoReq (for example, FlightPathInfoReportConfig) and/or information on nonCriticalExtension.

Technical features related to a UEInformationResponse message are described. For example, the UEInformationResponse message is used by the UE to transfer the information requested by the E-UTRAN.

For example, signalling radio bearer for the UEInformationResponse may include SRB1 or SRB2 (when logged measurement information is included). RLC-SAP for the UEInformationResponse may include an AM. Logical channel for the UEInformationResponse may include a DCCH. Direction for the UEInformationResponse may be UE to E-UTRAN.

For example, UEInformationResponse message may include a flightPathInfoReport. For example, the flightPathInfoReport may include information on one or more flightPaths and/or one or more wayPointLocations.

Technical features related to LocationInfo are described. For example, the IE LocationInfo is used to transfer detailed location information available at the UE to correlate measurements and UE position information.

For example, LocationInfo information element may include verticalVelocityInfo including information on a verticalVelocity and a vertical VelocityAndUncertainty.

For example, a verticalVelocityAndUncertainty may include information on a parameter verticalVelocityAndUncertainty corresponds to horizontalWithVerticalVelocityAndUncertainty. The first/leftmost bit of the first octet contains the most significant bit.

For example, a verticalVelocity may include information on a parameter verticalVelocity corresponds to horizontalWithVerticalVelocity. The first/leftmost bit of the first octet contains the most significant bit.

UE operations related to Event H1 (The Aerial UE height is above a threshold) are described.
The UE shall:
1> consider the entering condition for this event to be satisfied when condition H1-1, as specified below, is fulfilled;
1> consider the leaving condition for this event to be satisfied when condition H1-2, as specified below, is fulfilled;

$Ms-Hys>Thresh+Offset$  Inequality H1-1 (Entering condition)

$Ms+Hys<Thresh+Offset$  Inequality H1-2 (Leaving condition)

The variables in the formula are defined as follows:
$Ms$ is the Aerial UE height, not taking into account any offsets.
$Hys$ is the hysteresis parameter (i.e. h1-Hysteresis as defined within ReportConfigEUTRA) for this event.
$Thresh$ is the reference threshold parameter for this event given in MeasConfig (i.e. heightThreshRef as defined within MeasConfig).
$Offset$ is the offset value to heightThreshRef to obtain the absolute threshold for this event. (i.e. h1-Threshold-Offset as defined within ReportConfigEUTRA)
$Ms$ is expressed in meters.
$Thresh$ is expressed in the same unit as $Ms$.

UE operations related to Event H2 (The Aerial UE height is below a threshold) are described.
The UE shall:
1> consider the entering condition for this event to be satisfied when condition H2-1, as specified below, is fulfilled;
1> consider the leaving condition for this event to be satisfied when condition H2-2, as specified below, is fulfilled;

$Ms+Hys<Thresh+Offset$  Inequality H2-1 (Entering condition)

$Ms-Hys>Thresh+Offset$  Inequality H2-2 (Leaving condition)

The variables in the formula are defined as follows:
$Ms$ is the Aerial UE height, not taking into account any offsets.
$Hys$ is the hysteresis parameter (i.e. h2-Hysteresis as defined within ReportConfigEUTRA) for this event.
$Thresh$ is the reference threshold parameter for this event given in MeasConfig (i.e. heightThreshRef as defined within MeasConfig).
$Offset$ is the offset value to heightThreshRef to obtain the absolute threshold for this event. (i.e. h2-Threshold-Offset as defined within ReportConfigEUTRA)
$Ms$ is expressed in meters.
$Thresh$ is expressed in the same unit as $Ms$.

Hereinafter, technical features related to Aerial UE communication are described. Parts of section 23.17 of 3GPP TS 36.300 v16.5.0 may be referred.

E-UTRAN based mechanisms providing LTE connection to UEs capable of Aerial communication are supported via the following functionalities:
subscription-based Aerial UE identification and authorization.
height reporting based on the event that the UE's altitude has crossed a network-configured reference altitude threshold.
interference detection based on a measurement reporting that is triggered when a configured number of cells (i.e. larger than one) fulfills the triggering criteria simultaneously.
signalling of flight path information from UE to E-UTRAN.
Location information reporting, including UE's horizontal and vertical velocity.

[Subscription Based Identification of Aerial UE Function]

Support of Aerial UE function is stored in the user's subscription information in HSS. HSS transfers this information to the MME during Attach, Service Request and Tracking Area Update procedures.

The subscription information can be provided from the MME to the eNB via the S1 AP Initial Context Setup Request during Attach, Tracking Area Update and Service Request procedures. In addition, for X2-based handover, the source eNodeB can include the subscription information in the X2-AP Handover Request message to the target eNodeB.

For the intra and inter MME S1 based handover, the MME provides the subscription information to the target eNB after the handover procedure.

[Height Based Reporting for Aerial UE Communication]

An aerial UE can be configured with event based height reporting. UE sends height report when the altitude of the aerial UE is above or below a configured threshold. The report contains height and location if configured.

[Interference Detection and Mitigation for Aerial UE Communication]

For interference detection, an aerial UE can be configured with RRM event A3, A4 or A5 that triggers measurement report when individual (per cell) RSRP values for a configured number of cells fulfill the configured event. The report contains RRM results and location if configured.

For interference mitigation an aerial UE can be configured with a dedicated UE-specific alpha parameter for PUSCH power control.

[Flight Path Information Reporting]

E-UTRAN can request a UE to report flight path information consisting of a number of waypoints defined as 3D locations. A UE reports up to configured number of waypoints if flight path information is available at the UE. The report can consist also time stamps per waypoint if configured in the request and if available at the UE.

[Location Reporting for Aerial UE Communication]

Location information for Aerial UE communication can include horizontal and vertical speed if configured. Location information can be included in RRM report and in height report.

Hereinafter, technical features related to network slicing are described. Parts of section 4.6 of 3GPP TS 24.501 v17.6.1 may be referred.

The 5GS supports network slicing. Within a PLMN or SNPN, a network slice is identified by an S-NSSAI, which is comprised of a slice/service type (SST) and a slice differentiator (SD). Inclusion of an SD in an S-NSSAI is optional. A set of one or more S-NSSAIs is called the NSSAI. The following NSSAIs are defined:
 a) configured NSSAI;
 b) requested NSSAI;
 c) allowed NSSAI;
 d) subscribed S-NSSAIs; and
 e) pending NSSAI.

The following NSSAIs are defined in the present document:
 a) rejected NSSAI for the current PLMN or SNPN;
 b) rejected NSSAI for the current registration area;
 c) rejected NSSAI for the failed or revoked NSSAA; and
 d) rejected NSSAI for the maximum number of UEs reached.

In roaming scenarios, rejected NSSAI for the current PLMN or SNPN, or rejected NSSAI for the current registration area, or rejected NSSAI for the maximum number of UEs reached includes one or more S-NSSAI for the current PLMN and also contains a set of mapped S-NSSAI(s) if available. An S-NSSAI included in the rejected NSSAI for the failed or revoked NSSAA is an HPLMN S-NSSAI.

In case of a PLMN, a serving PLMN may configure a UE with the configured NSSAI per PLMN. In addition, the HPLMN may configure a UE with a single default configured NSSAI and consider the default configured NSSAI as valid in a PLMN for which the UE has neither a configured NSSAI nor an allowed NSSAI.

In case of an SNPN, the SNPN may configure a UE with a configured NSSAI applicable to the SNPN if the UE is neither registering nor registered for onboarding services in SNPN. In addition, the credential holder may configure a single default configured NSSAI associated with the selected entry of the "list of subscriber data" or the PLMN subscription and consider the default configured NSSAI as valid in a SNPN for which the UE has neither a configured NSSAI nor an allowed NSSAI. If the UE is registering or registered for onboarding services in SNPN, the serving SNPN shall not provide a configured NSSAI to the UE.

The allowed NSSAI and the rejected NSSAI for the current registration area are managed per access type independently, i.e. 3GPP access or non-3GPP access, and is applicable for the registration area. If the UE does not have a valid registration area, the rejected NSSAI for the current registration area is applicable to the tracking area on which it was received. If the registration area contains TAIs belonging to different PLMNs, which are equivalent PLMNs, the allowed NSSAI and the rejected NSSAI for the current registration area are applicable to these PLMNs in this registration area.

Upon registration to a PLMN or SNPN (except for the registration procedure for periodic registration update, the initial registration for onboarding services in SNPN, and the registration procedure for mobility registration update when registered for onboarding services in SNPN), the UE shall send to the AMF the requested NSSAI which includes one or more S-NSSAIs of the allowed NSSAI for the PLMN or SNPN or the configured NSSAI and corresponds to the network slice(s) to which the UE intends to register with, if:
 a) the UE has a configured NSSAI for the current PLMN or SNPN;
 b) the UE has an allowed NSSAI for the current PLMN or SNPN; or
 c) the UE has neither allowed NSSAI for the current PLMN nor configured NSSAI for the current PLMN or SNPN and has a default configured NSSAI. In this case the UE indicates to the AMF that the requested NSSAI is created from the default configured NSSAI.

Hereinafter, technical features related to mobility and periodic registration update initiation are described. Parts of section 5.5.1.3.2 of 3GPP TS 24.501 v17.6.1 may be referred.

The UE in state 5GMM-REGISTERED shall initiate the registration procedure for mobility and periodic registration update by sending a REGISTRATION REQUEST message to the AMF,
 a) when the UE detects entering a tracking area that is not in the list of tracking areas that the UE previously registered in the AMF;
 b) when the periodic registration updating timer T3512 expires in 5GMM-IDLE mode;
 c) when the UE receives a CONFIGURATION UPDATE COMMAND message indicating "registration requested" in the Registration requested bit of the Configuration update indication IE;
 d) when the UE in state 5GMM-REGISTERED.ATTEMPTING-REGISTRATION-UPDATE either receives a paging or the UE receives a NOTIFICATION message with access type indicating 3GPP access over the non-3GPP access for PDU sessions associated with 3GPP access;

As an implementation option, MUSIM UE is allowed to not respond to paging based on the information available in the paging message, e.g. voice service indication.

e) upon inter-system change from S1 mode to N1 mode and if the UE previously had initiated an attach procedure or a tracking area updating procedure when in S1 mode;

f) when the UE receives an indication of "RRC Connection failure" from the lower layers and does not have signalling pending (i.e. when the lower layer requests NAS signalling connection recovery) except for the case;

g) when the UE changes the 5GMM capability or the S1 UE network capability or both;

h) when the UE's usage setting changes;

i) when the UE needs to change the slice(s) it is currently registered to;

j) when the UE changes the UE specific DRX parameters.

Hereinafter, technical features related to identification and selection of a Network Slice: the S-NSSAI and the NSSAI are described. Parts of section 5.15.2 of 3GPP TS 23.501 v17.4.0 may be referred.

An S-NSSAI identifies a Network Slice.

An S-NSSAI is comprised of:

A Slice/Service type (SST), which refers to the expected Network Slice behaviour in terms of features and services;

A Slice Differentiator (SD), which is optional information that complements the Slice/Service type(s) to differentiate amongst multiple Network Slices of the same Slice/Service type.

The NSSAI is a collection of S-NSSAIs. An NSSAI may be a Configured NSSAI, a Requested NSSAI or an Allowed NSSAI. There can be at most eight S-NSSAIs in Allowed and Requested NSSAIs sent in signalling messages between the UE and the Network. The Requested NSSAI signalled by the UE to the network allows the network to select the Serving AMF, Network Slice(s) and Network Slice instance(s) for this UE.

Based on the operator's operational or deployment needs, a Network Slice instance can be associated with one or more S-NSSAIs, and an S-NSSAI can be associated with one or more Network Slice instances. Multiple Network Slice instances associated with the same S-NSSAI may be deployed in the same or in different Tracking Areas. When multiple Network Slice instances associated with the same S-NSSAI are deployed in the same Tracking Areas, the AMF instance serving the UE may logically belong to (i.e. be common to) more than one Network Slice instance associated with this S-NSSAI.

The (R)AN may use Requested NSSAI in access stratum signalling to handle the UE Control Plane connection before the 5GC informs the (R)AN of the Allowed NSSAI. The Requested NSSAI is used by the RAN for AMF selection, as described in clause 6.3.5. The UE shall not include the Requested NSSAI in the RRC Resume when the UE asks to resume the RRC connection and is CM-CONNECTED with RRC Inactive state.

When a UE is successfully registered over an Access Type, the CN informs the (R)AN by providing the Allowed NSSAI for the corresponding Access Type.

Hereinafter, technical features related to Tracking area updating procedure are described. Parts of section 5.5.3 of 3GPP TS 24.301 v17.6.0 may be referred.

The tracking area updating procedure is always initiated by the UE and is used for the following purposes:

normal tracking area updating to update the registration of the actual tracking area of a UE in the network;

combined tracking area updating to update the registration of the actual tracking area for a UE in CS/PS mode 1 or CS/PS mode 2 of operation;

periodic tracking area updating to periodically notify the availability of the UE to the network;

IMSI attach for non-EPS services when the UE is attached for EPS services. This procedure is used by a UE in CS/PS mode 1 or CS/PS mode 2 of operation;

in various cases of inter-system change from Iu mode to S1 mode or from A/Gb mode to S1 mode;

in various cases of inter-system change from N1 mode to S1 mode if the UE operates in single-registration mode;

S101 mode to S1 mode inter-system change;

MME load balancing;

to update certain UE specific parameters in the network;

recovery from certain error cases;

to indicate that the UE enters S1 mode after CS fallback or 1xCS fallback;

to indicate to the network that the UE has selected a CSG cell whose CSG identity and associated PLMN identity are not included in the UE's Allowed CSG list or in the UE's Operator CSG list;

to indicate the current radio access technology to the network for the support of terminating access domain selection for voice calls or voice sessions;

to indicate to the network that the UE has locally released EPS bearer context(s); and to indicate to the network that the MUSIM UE needs to use an IMSI Offset value that is used for deriving the paging occasion.

The periodic tracking area updating procedure is controlled in the UE by timer T3412. When timer T3412 expires, the periodic tracking area updating procedure is started.

The UE in state EMM-REGISTERED shall initiate the tracking area updating procedure by sending a TRACKING AREA UPDATE REQUEST message to the MME.

If the tracking area update request has been accepted by the network, the MME shall send a TRACKING AREA UPDATE ACCEPT message to the UE. If the MME assigns a new GUTI for the UE, a GUTI shall be included in the TRACKING AREA UPDATE ACCEPT message. If the MME includes the GUTI IE in the TRACKING AREA UPDATE ACCEPT message, the MME shall start timer T3450 and enter state EMM-COMMON-PROCEDURE-INITIATED as described in clause 5.4.1. The MME may include a new TAI list for the UE in the TRACKING AREA UPDATE ACCEPT message. The MME shall not assign a TAI list containing both tracking areas in NB-S1 mode and tracking areas in WB-S1 mode.

If the tracking area updating cannot be accepted by the network, the MME sends a TRACKING AREA UPDATE REJECT message to the UE including an appropriate EMM cause value.

Meanwhile, in NR, the network may configure the configurations related to NAS, such as IMS, network-slice, during the registration procedure for a registration area, and most NAS parameters may be applicable for the registration area.

The UE may initiate the registration process when it needs to change some settings, such as slice(s), other than when the UE detects that the UE is entering a tracking area that is not in the list of previously registered tracking areas with AMF.

In other words, for the aerial UE, if some settings related to NAS in the UE need to be updated based on the height, the UE can perform the registration process. However, if the network needs to update the NAS configuration based on its height, there is no process to inform the network (NAS) of the height of the UE. The network may need height information to provide an aerial UE-specific service. Therefore, it is necessary to inform the network (NAS) that the height of the UE has changed.

Therefore, studies for height-based location update in a wireless communication system are required.

Hereinafter, a method for height-based location update in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 10:
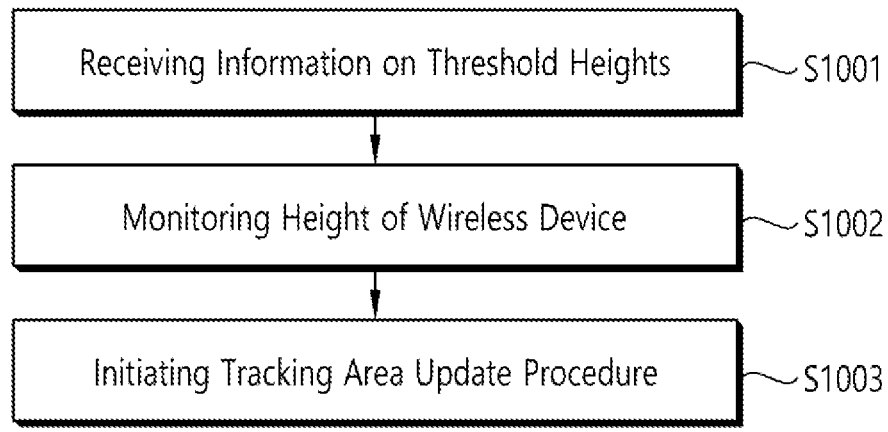
FIG. 10 shows an example of a method for height-based location update in a wireless communication system, according to some embodiments of the present disclosure.

FIG. 10 shows an example of a method for height-based location update in a wireless communication system, according to some embodiments of the present disclosure.

In particular, FIG. 10 shows an example of a method performed by a wireless device in a wireless communication system.

In step S1001, a wireless device may receive information on one or more threshold heights between a plurality of height spans.

For example, network may configure a single threshold height or multiple threshold heights.

For example, the wireless device may receive a configuration including information on a single threshold height. For another example, the wireless device may receive a configuration including information on multiple threshold heights.

In step S1002, a wireless device may monitor a height of the wireless device.

For example, the wireless device may determine a current height span among the plurality of height spans based on the height of the wireless device. The wireless device may apply a configuration associated with the current height span.

For example, the configuration associated with the current height span may include a network slice configuration according to the current height span.

For example, the configuration associated with the current height span may include a IP Multimedia Subsystem (IMS) configuration according to the current height span.

For example, the configuration associated with the current height span may include a Multicast and Broadcast Services (MBS) configuration according to the current height span.

For example, when the current height span is different from the previous height span, the wireless device may apply a configuration associated with the current height span. In other words, then the height span of the wireless device is changed, the wireless device may apply a configuration associated with the current height span.

In step S1003, a wireless device may initiate a tracking area update procedure based on the height of the wireless device being passed the one or more threshold heights.

For example, the wireless device may initiate the tracking area update procedure based on a height span of the wireless device being changed.

For example, the wireless device may transmit, to an AMF, a TRACKING AREA UPDATE REQUEST message including information on the height of the wireless device. The wireless device may receive, from the AMF, a TRACKING AREA UPDATE ACCEPT message.

According to some embodiments of the present disclosure, the wireless device may perform registration procedure based on the height of the wireless device being passed the one or more threshold heights.

For example, the wireless device may transmit, to an Access and Mobility management Function (AMF), a registration request message including information on the current height span. The wireless device may receive, from the AMF, a registration accept message including a new configuration for the current height span.

For example, the new configuration may include a Non-Access-Stratum (NAS) configuration or an Access-Stratum (AS) configuration related to the current height span. For example, the new configuration may include a slice priority or slice group priority information applicable for the current height span.

According to some embodiments of the present disclosure, the wireless device may be in communication with at least one of a user equipment, a network, or an autonomous vehicle other than the wireless device.

Hereinafter, embodiments of a method for height-based location update in a wireless communication system are described.

The network may configure one or more thresholds related to the height of the UE. The threshold(s) may divide the entire height space into several height spans. The height spans may be disjoint so that each height span covers a unique height range.

The UE may determine the current height to decide whether to initiate a registration procedure for the network.

For example, the UE may initiate the registration procedure when the current height is higher than the threshold.

For example, the UE may initiate the registration procedure when the current height is lower than the threshold.

For example, the UE may initiate the registration procedure when the current height span is different from the height span considered by the previous location update procedure.

The network may configure different configurations according to the height.

For example, different network slice configurations are based on height. (UAV-specific slice)

For example, different IMS configurations are based on height. (UAV-specific IMS service)

For example, different MBS configurations are based on height. (UAV-specific MBS service)

The UE may perform a registration procedure based on the thresholds related to height. While performing registration, the UE may receive new NAS or AS configurations related to the height. For example, the UE may be configured with new slice priority or slice group priority information applicable for the height.

Figure 11:
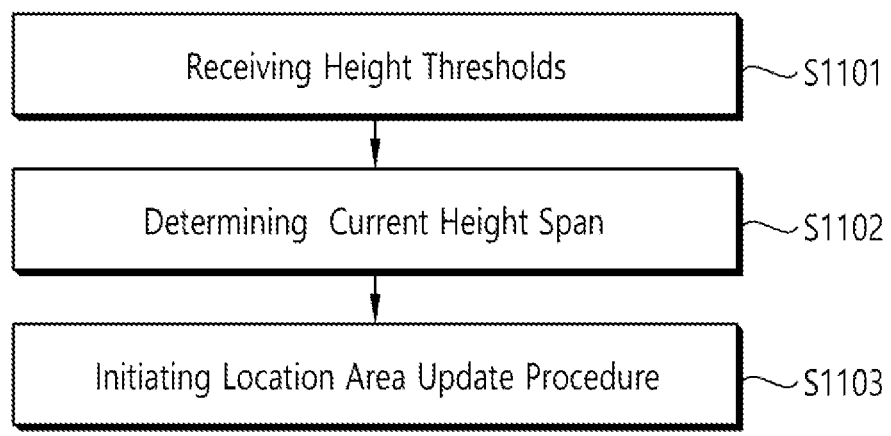
FIG. 11 shows an example of a method for height-based location update procedure in a wireless communication system, according to some embodiments of the present disclosure.

FIG. 11 shows an example of a method for height-based location update procedure in a wireless communication system, according to some embodiments of the present disclosure.

In step S1101, UE may receive, from a network, one more height thresholds related to a height of the UE.

For example, the N threshold divides the entire height space into N+1 disjoint height spans.

In step S1102, UE may determine the current height span based on the current UE height.

In step S1103, UE may initiate a location area update procedure based on the current height span.

For example, UE may initiate a location area update procedure if the current height span is different from the height span considered by the previous location update procedure.

For example, the location area update may indicate that the UE enters a new height span. For example, the UE may indicate the current height of the UE or the current height span.

Figure 12:
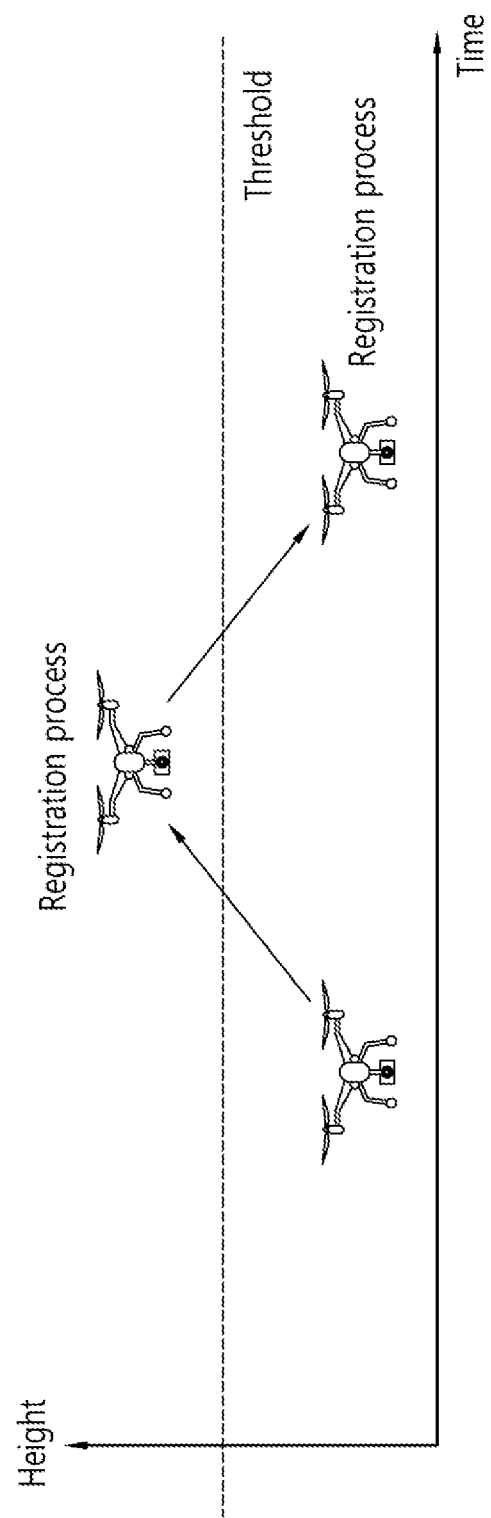
FIG. 12 shows an example of a method for registration update with a threshold, according to some embodiments of the present disclosure.

FIG. 12 shows an example of a method for registration update with a threshold, according to some embodiments of the present disclosure.

Referring to FIG. 12, a UE may configure a threshold height (for example, a single threshold height). That is, there may be two height spans separated by the single threshold height.

For example, UE may be located below than the threshold height. For example, when the UE passes the threshold height by raising the UE's altitude (for example, when the height of the UE is passed the threshold height), the UE may perform the registration process and/or location update process (for example, a TA update process). For example, when the UE passes the threshold height by lowering the UE's altitude (for example, when the UE's altitude is passed the threshold height), the UE may perform the registration process and/or location update process (for example, a TA update process).

For other example, UE may be located above than the threshold height. For example, when the UE passes the threshold height by lowering the UE's altitude (for example, when the height of the UE is passed the threshold height), the UE may perform the registration process and/or location update process (for example, a TA update process). For example, when the UE passes the threshold height by raising the UE's altitude (for example, when the UE's altitude is passed the threshold height), the UE may perform the registration process and/or location update process (for example, a TA update process).

Figure 13:
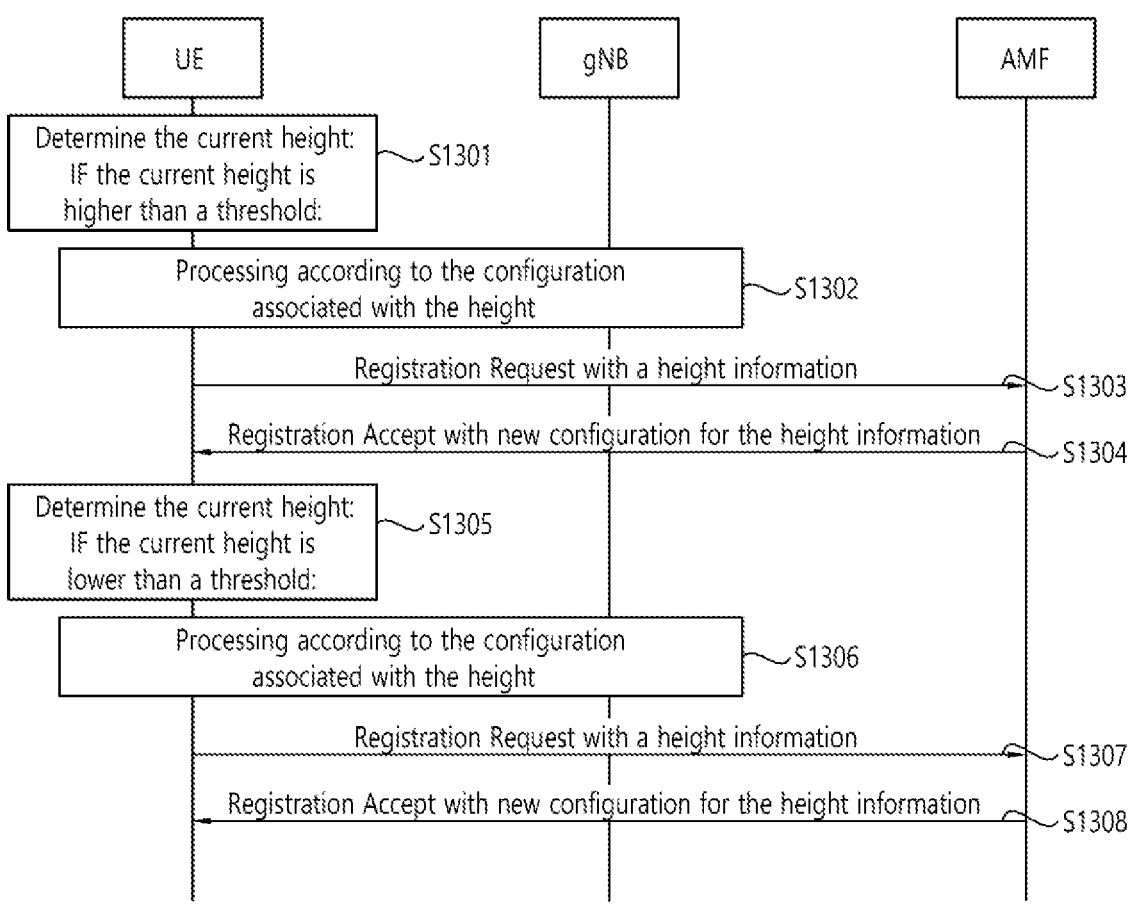
FIG. 13 shows an example of a method for registration update with a threshold, according to some embodiments of the present disclosure.

FIG. 13 shows an example of a method for registration update with a threshold, according to some embodiments of the present disclosure.

Referring to FIG. 13, in step S1301, UE may determine the current height. For example, UE may determine that the current height is higher than a threshold.

In step S1302, UE may perform, with a gNB, processing according to the configuration associated with the height. For example, UE may perform processing based on the current height which is higher than the threshold.

In step S1303, UE may transmit, to an AMF (for example, via the gNB), a registration request with a height information.

In step S1304, UE may receive, form the AMF (for example, via the gNB), a registration accept with new configuration for the height information.

In step S1305, UE may determine the current height. For example, UE may determine that the current height is lower than a threshold.

In step S1306, UE may perform, with a gNB, processing according to the configuration associated with the height. For example, UE may perform processing based on the current height which is lower than the threshold.

In step S1307, UE may transmit, to an AMF (for example, via the gNB), a registration request with a height information.

In step S1308, UE may receive, form the AMF (for example, via the gNB), a registration accept with new configuration for the height information.

Figure 14:
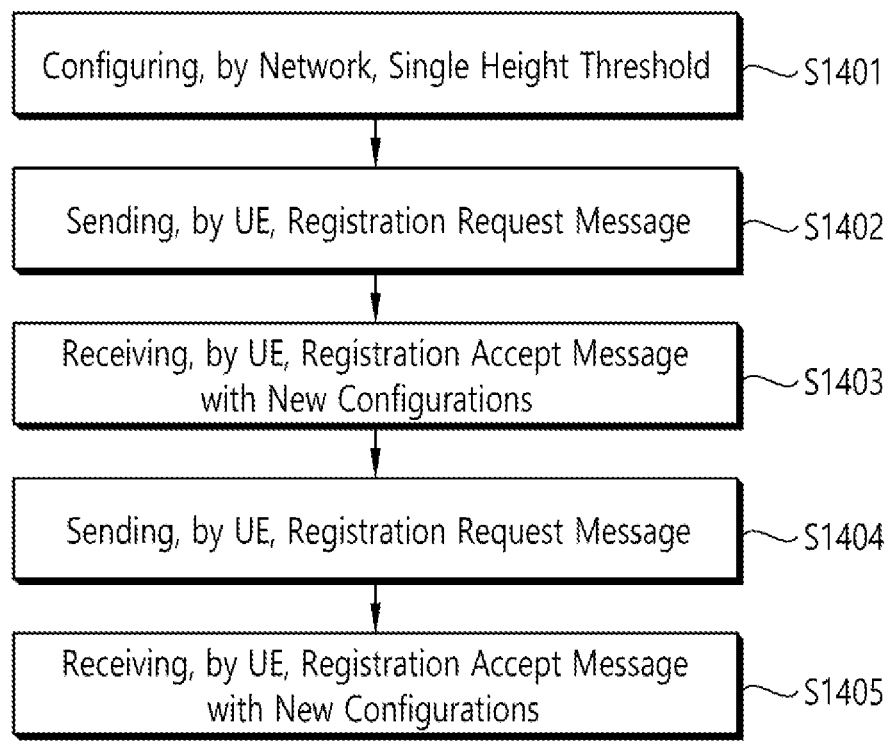
FIG. 14 shows an example of a method for registration update with a threshold, according to some embodiments of the present disclosure.

FIG. 14 shows an example of a method for registration update with a threshold, according to some embodiments of the present disclosure.

Referring to FIG. 14, in step S1401, the network may configure a threshold related to the height of the UE. The threshold may divide the entire height space into disjoint height spans.

In step S1402, at an altitude that is different from the height span considered by the previous registration update procedure (that is, at an altitude higher than the threshold in FIG. 1), the UE may send a registration request message to the network.

For example, at an altitude higher than the threshold, the UE may send a registration request message to the network.

In step S1403, the UE may receive a registration accept message with new configurations for the height from the network.

In step S1404, at an altitude that is different from the height span considered by the previous registration update procedure (that is, at an altitude lower than the threshold in FIG. 1), the UE sends a registration request message to the network.

In step S1405, the UE may receive a registration accept message with new configurations for the height from the network.

Figure 15:
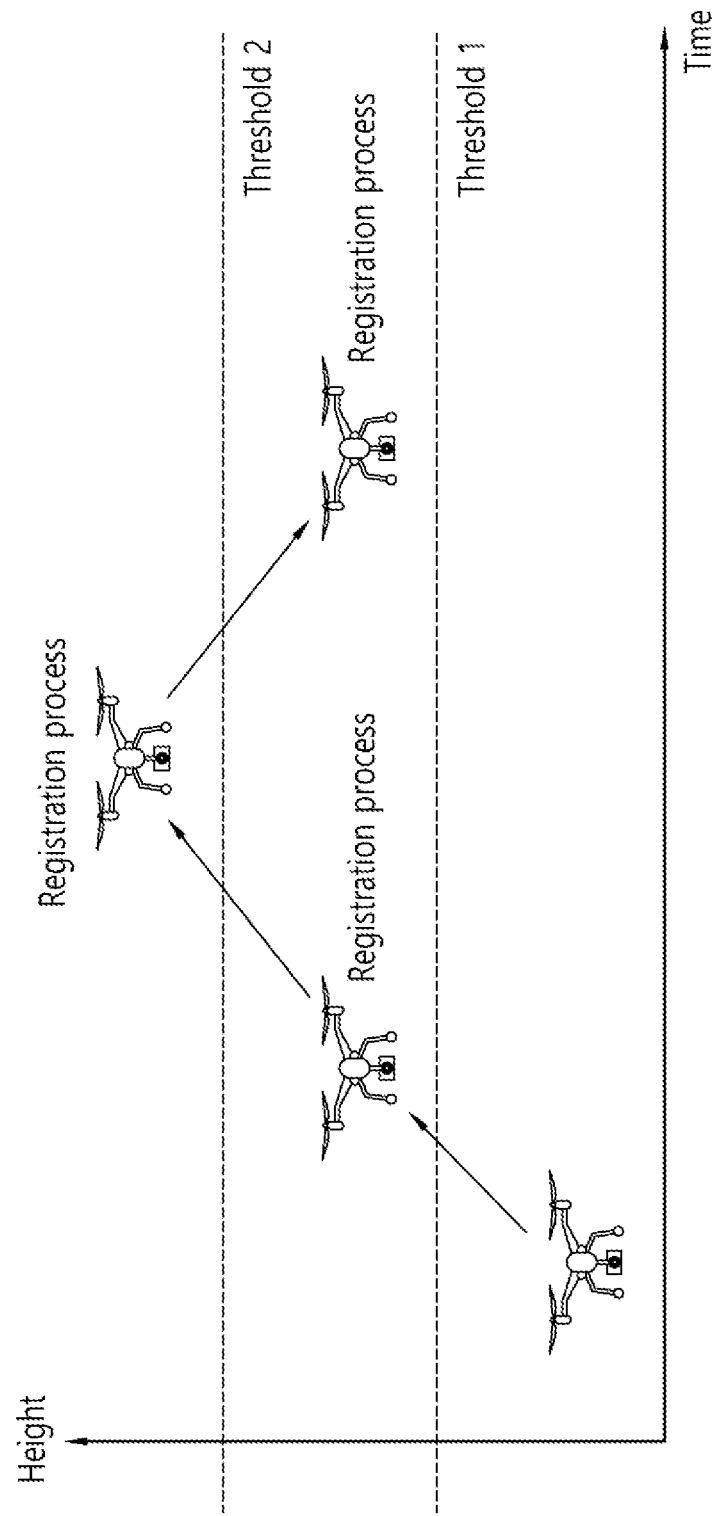
FIG. 15 shows an example of a method for registration update with multiple thresholds, according to some embodiments of the present disclosure.

FIG. 15 shows an example of a method for registration update with multiple thresholds, according to some embodiments of the present disclosure.

Referring to FIG. 15, a UE may configure multiple threshold heights (for example, N threshold heights). That is, there may be N+1 height spans separated by the N threshold heights.

For example, when the UE passes the threshold height by raising or lowering the UE's altitude, the UE may perform the registration process and/or location update process (for example, a TA update process).

In other words, for example, when the height of the UE is passed the first threshold height (Threshold 1) or the second threshold height (Threshold 2), the UE may perform the registration process and/or location update process (for example, a TA update process).

Figure 16:
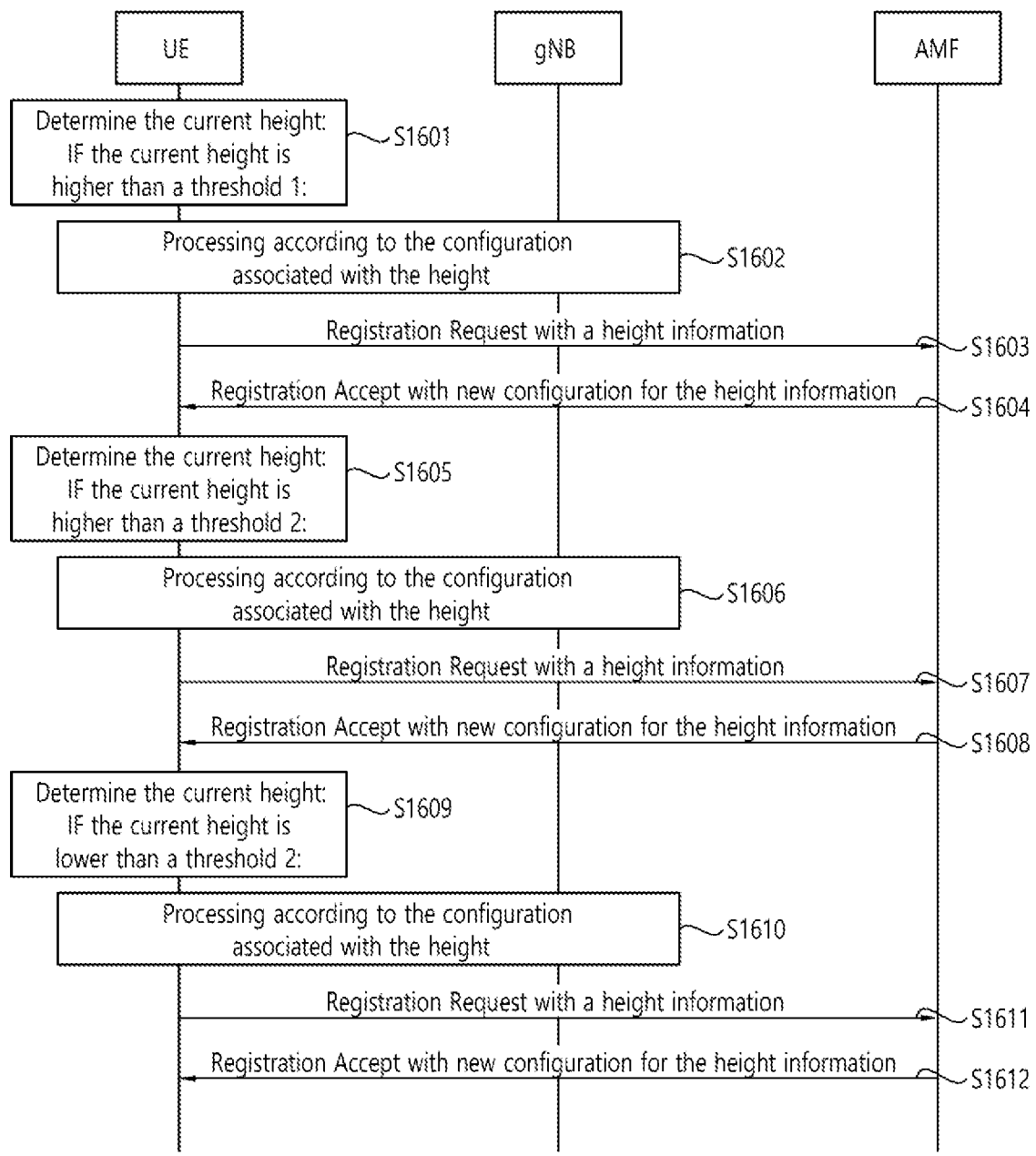
FIG. 16 shows an example of a method for registration update with multiple thresholds, according to some embodiments of the present disclosure.

FIG. 16 shows an example of a method for registration update with multiple thresholds, according to some embodiments of the present disclosure.

Referring to FIG. 16, in step S1601, UE may determine the current height. For example, UE may determine that the current height is higher than a threshold 1.

In step S1602, UE may perform, with a gNB, processing according to the configuration associated with the height. For example, UE may perform processing based on the current height which is higher than the threshold 1.

In step S1603, UE may transmit, to an AMF (for example, via the gNB), a registration request with a height information.

In step S1604, UE may receive, form the AMF (for example, via the gNB), a registration accept with new configuration for the height information.

In step S1605, UE may determine the current height. For example, UE may determine that the current height is higher than a threshold 2.

For example, the threshold 2 is higher than the threshold 1.

In step S1606, UE may perform, with a gNB, processing according to the configuration associated with the height. For example, UE may perform processing based on the current height which is higher than the threshold 2.

In step S1607, UE may transmit, to an AMF (for example, via the gNB), a registration request with a height information.

In step S1608, UE may receive, form the AMF (for example, via the gNB), a registration accept with new configuration for the height information.

In step S1609, UE may determine the current height. For example, UE may determine that the current height is lower than a threshold 2.

In step S1610, UE may perform, with a gNB, processing according to the configuration associated with the height. For example, UE may perform processing based on the current height which is lower than the threshold 2.

In step S1611, UE may transmit, to an AMF (for example, via the gNB), a registration request with a height information.

In step S1612, UE may receive, form the AMF (for example, via the gNB), a registration accept with new configuration for the height information.

Figure 17:
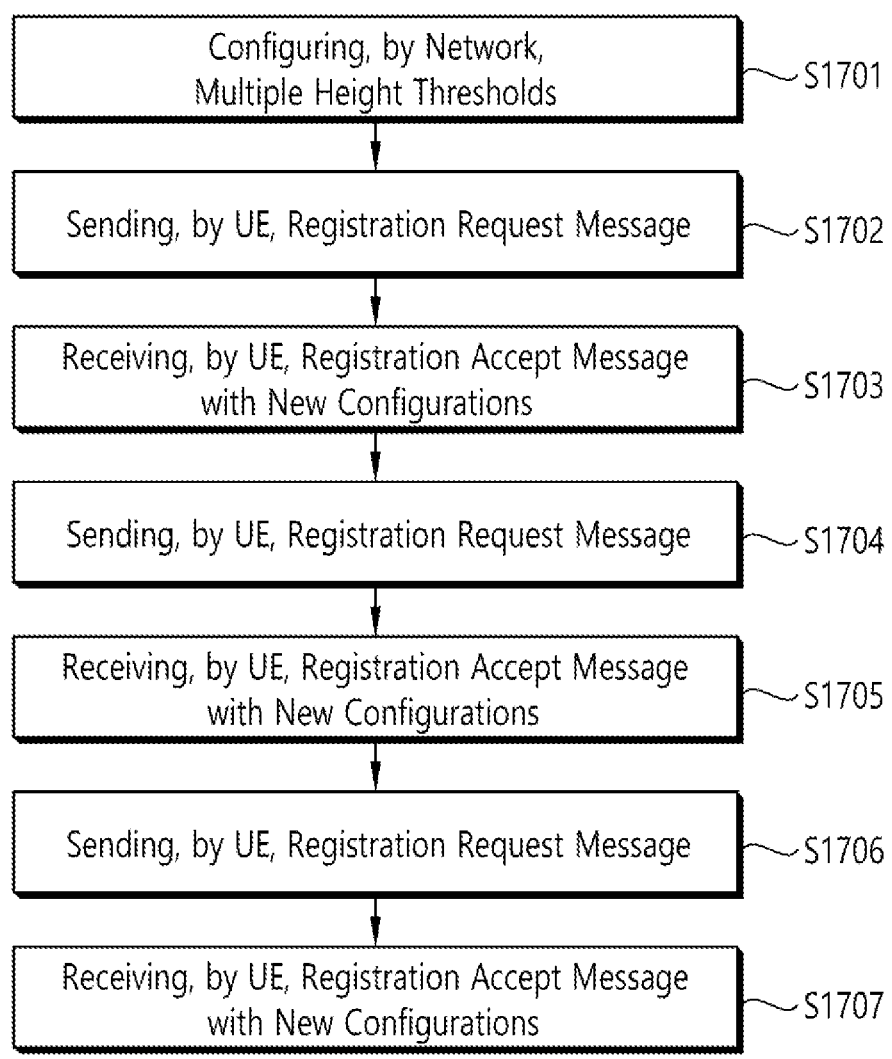
FIG. 17 shows an example of a method for registration update with multiple thresholds, according to some embodiments of the present disclosure.

FIG. 17 shows an example of a method for registration update with multiple thresholds, according to some embodiments of the present disclosure.

Referring to FIG. 17, in step S1701, the network may configure several thresholds related to the height of the UE. The thresholds may divide the entire height space into disjoint height spans.

In step S1702, at an altitude that is different from the height span considered by the previous registration update procedure (that is, at an altitude higher than a first threshold, Threshold 1), the UE may send a registration request message to the network.

In step S1703, the UE may receive a registration accept message with new configurations for the height from the network.

In step S1704, at an altitude that is different from the height span considered by the previous registration update procedure (that is, at an altitude higher than a second threshold, Threshold 2), the UE may send a registration request message to the network.

In step S1705, the UE may receive a registration accept message with new configurations for the height from the network.

In step S1706, at an altitude that is different from the height span considered by the previous registration update procedure (that is, at an altitude lower than the second threshold, Threshold 2), the UE may send a registration request message to the network.

In step S1707, the UE receive a registration accept message with new configurations for the height from the network.

Figure 18:
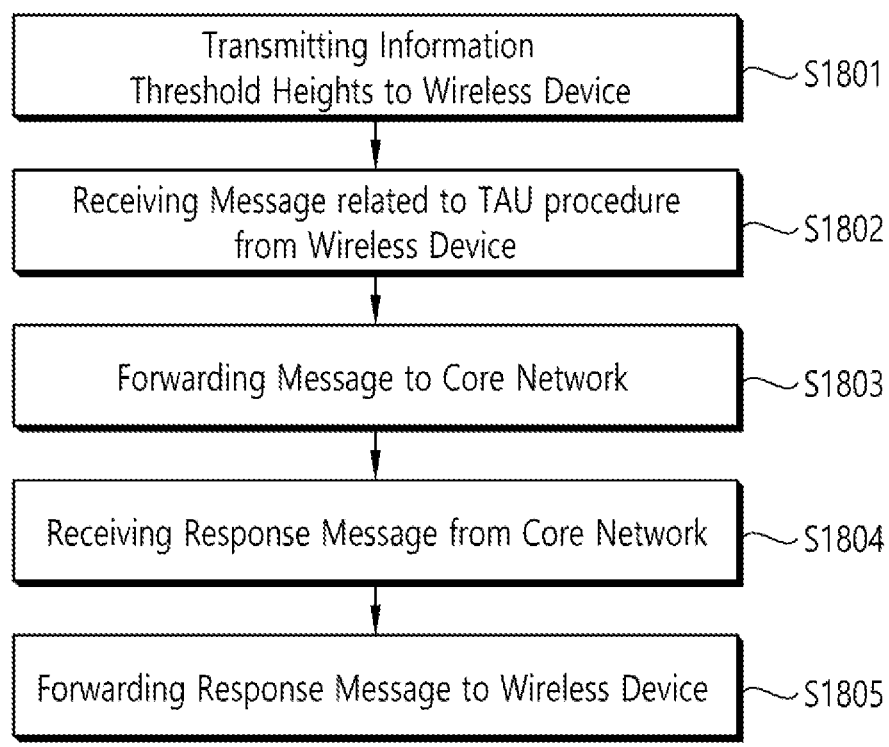
FIG. 18 shows an example of Base Station (BS) operations for height-based location update in a wireless communication system, according to some embodiments of the present disclosure.

FIG. 18 shows an example of Base Station (BS) operations for height-based location update in a wireless communication system, according to some embodiments of the present disclosure.

In step S1801, a BS may transmit, to a wireless device, information on one or more threshold heights between a plurality of height spans.

For example, the BS may transmit, to the wireless device, a configuration including information on the one or more height thresholds In step S1802, the BS may receive, from the wireless device, a message related to a tracking area update (TAU) procedure including information on the height of the wireless device.

For example, the BS may receive, from the wireless device, a TRACKING AREA UPDATE REQUEST message including information on the height of the wireless device.

In step S1803, the BS may forward the received message to a core network.

For example, the BS may forward the TRACKING AREA UPDATE REQUEST message to an AMF.

In step S1804, the BS may receive a response message related to the tracking area update procedure from the core network.

For example, the BS may receive the TRACKING AREA UPDATE ACCEPT message from the AMF.

In step S1805, the BS may forward the response message related to the tracking area update procedure to the wireless device.

For example, the BS may forwards the TRACKING AREA UPDATE ACCEPT message to the wireless device.

Some of the detailed steps shown in the examples of FIGS. 10-18 may not be essential steps and may be omitted. In addition to the steps shown in FIGS. 10-18, other steps may be added, and the order of the steps may vary. Some of the above steps may have their own technical meaning.

Hereinafter, an apparatus for height-based location update in a wireless communication system, according to some embodiments of the present disclosure, will be described. Herein, the apparatus may be a wireless device (100 or 200) in FIGS. 2, 3, and 5.

For example, a wireless device may perform the methods described above. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to control the transceiver 106 to receive information on one or more threshold heights between a plurality of height spans. The processor 102 may be configured to monitor a height of the wireless device. The processor 102 may be configured to initiate a tracking area update procedure based on the height of the wireless device being passed the one or more threshold heights.

For example, the processor 102 may be configured to initiate the tracking area update procedure based on a height span of the wireless device being changed.

For example, the processor 102 may be configured to determine a current height span among the plurality of height spans based on the height of the wireless device.

For example, the processor 102 may be configured to apply a configuration associated with the current height span.

For example, the configuration associated with the current height span may include a network slice configuration according to the current height span.

For example, the configuration associated with the current height span may include a IP Multimedia Subsystem (IMS) configuration according to the current height span.

For example, the configuration associated with the current height span may include a Multicast and Broadcast Services (MBS) configuration according to the current height span.

For example, the processor 102 may be configured to control the transceiver 106 to transmit, to an Access and Mobility management Function (AMF), a registration request message including information on the current height span.

For example, the processor 102 may be configured to control the transceiver 106 to receive, from the AMF, a registration accept message including a new configuration for the current height span.

For example, the new configuration may include a Non-Access-Stratum (NAS) configuration or an Access-Stratum (AS) configuration related to the current height span.

For example, the new configuration may include a slice priority or slice group priority information applicable for the current height span.

For example, in the tracking area update procedure, the processor 102 may be configured to control the transceiver 106 to transmit, to an AMF, a TRACKING AREA UPDATE REQUEST message including information on the height of the wireless device. The processor 102 may be configured to control the transceiver 106 to receive, from the AMF, a TRACKING AREA UPDATE ACCEPT message.

For example, the processor 102 may be configured to control the transceiver 106 to be in communication with at least one of a user equipment, a network, or an autonomous vehicle other than the wireless device.

Hereinafter, a processor for a wireless device for height-based location update in a wireless communication system, according to some embodiments of the present disclosure, will be described.

The processor may be configured to control the wireless device to receive information on one or more threshold heights between a plurality of height spans. The processor may be configured to control the wireless device to monitor a height of the wireless device. The processor may be configured to control the wireless device to initiate a tracking area update procedure based on the height of the wireless device being passed the one or more threshold heights.

For example, the processor may be configured to control the wireless device to initiate the tracking area update procedure based on a height span of the wireless device being changed.

For example, the processor may be configured to control the wireless device to determine a current height span among the plurality of height spans based on the height of the wireless device.

For example, the processor may be configured to control the wireless device to apply a configuration associated with the current height span.

For example, the configuration associated with the current height span may include a network slice configuration according to the current height span.

For example, the configuration associated with the current height span may include a IP Multimedia Subsystem (IMS) configuration according to the current height span.

For example, the configuration associated with the current height span may include a Multicast and Broadcast Services (MBS) configuration according to the current height span.

For example, the processor may be configured to control the wireless device to transmit, to an Access and Mobility management Function (AMF), a registration request message including information on the current height span.

For example, the processor may be configured to control the wireless device to receive, from the AMF, a registration accept message including a new configuration for the current height span.

For example, the new configuration may include a Non-Access-Stratum (NAS) configuration or an Access-Stratum (AS) configuration related to the current height span.

For example, the new configuration may include a slice priority or slice group priority information applicable for the current height span.

For example, in the tracking area update procedure, the processor may be configured to control the wireless device to transmit, to an AMF, a TRACKING AREA UPDATE REQUEST message including information on the height of the wireless device. The processor may be configured to control the wireless device to receive, from the AMF, a TRACKING AREA UPDATE ACCEPT message.

For example, the processor may be configured to control the wireless device to be in communication with at least one of a user equipment, a network, or an autonomous vehicle other than the wireless device.

Hereinafter, a non-transitory computer-readable medium has stored thereon a plurality of instructions for height-based location update in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to receive information on one or more threshold heights between a plurality of height spans. The stored a plurality of instructions may cause the wireless device to monitor a height of the wireless device. The stored a plurality of instructions may cause the wireless device to initiate a tracking area update procedure based on the height of the wireless device being passed the one or more threshold heights.

For example, the stored a plurality of instructions may cause the wireless device to initiate the tracking area update procedure based on a height span of the wireless device being changed.

For example, the stored a plurality of instructions may cause the wireless device to determine a current height span among the plurality of height spans based on the height of the wireless device.

For example, the stored a plurality of instructions may cause the wireless device to apply a configuration associated with the current height span.

For example, the configuration associated with the current height span may include a network slice configuration according to the current height span.

For example, the configuration associated with the current height span may include a IP Multimedia Subsystem (IMS) configuration according to the current height span.

For example, the configuration associated with the current height span may include a Multicast and Broadcast Services (MBS) configuration according to the current height span.

For example, the stored a plurality of instructions may cause the wireless device to transmit, to an Access and Mobility management Function (AMF), a registration request message including information on the current height span.

For example, the stored a plurality of instructions may cause the wireless device to receive, from the AMF, a registration accept message including a new configuration for the current height span.

For example, the new configuration may include a Non-Access-Stratum (NAS) configuration or an Access-Stratum (AS) configuration related to the current height span.

For example, the new configuration may include a slice priority or slice group priority information applicable for the current height span.

For example, in the tracking area update procedure, the stored a plurality of instructions may cause the wireless device to transmit, to an AMF, a TRACKING AREA UPDATE REQUEST message including information on the height of the wireless device. The stored a plurality of instructions may cause the wireless device to receive, from the AMF, a TRACKING AREA UPDATE ACCEPT message.

According to some embodiments of the present disclosure, the stored a plurality of instructions may cause the wireless device to be in communication with at least one of a user equipment, a network, or an autonomous vehicle other than the wireless device.

Hereinafter, a base station (BS) for height-based location update in a wireless communication system, according to some embodiments of the present disclosure, will be described.

The BS may include a transceiver, a memory, and a processor operatively coupled to the transceiver and the memory.

The processor may be configured to control the transceiver to transmit, to a wireless device, information on one or more threshold heights between a plurality of height spans. The processor may be configured to control the transceiver to receive, from the wireless device, a message related to a tracking area update (TAU) procedure including information on the height of the wireless device. The processor may be configured to forward the received message to a core network. The processor may be configured to receive a response message related to the tracking area update procedure from the core network. The processor may be configured to control the transceiver to forward the response message related to the tracking area update procedure to the wireless device.

The present disclosure can have various advantageous effects.

According to some embodiments of the present disclosure, a wireless device could efficiently perform the height-based location update.

For example, as UAV UEs are commercialized, the network will provide more diverse services exclusively for UAV UEs. Based on the height-based registration, the network can configure new NAS or AS configurations related to the height and provide UAV-specific services to the UE.

In other words, according to the present disclosure, a wireless device (for example, a UAV UE) could perform location area update according to the change in height of the wireless device.

According to some embodiments of the present disclosure, a wireless network system could provide an efficient solution for the height-based location update Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:
   receiving, by a wireless device, information related to one or more threshold heights between a plurality of height spans;
   monitoring, by the wireless device, a height of the wireless device;
   determining, by the wireless device, a current height span among the plurality of height spans based on the height of the wireless device;
   applying, by the wireless device, a configuration associated with the current height span,
   wherein the configuration associated with the current height span includes a network slice configuration according to the current height span; and
   initiating, by the wireless device, a tracking area update procedure based on the height of the wireless device being passed the one or more threshold heights.

2. The method of claim 1, wherein the method further comprises,
   initiating the tracking area update procedure based on a height span of the wireless device being changed.

3. The method of claim 1,
   wherein the configuration associated with the current height span includes a IP Multimedia Subsystem (IMS) configuration according to the current height span.

4. The method of claim 1,
wherein the configuration associated with the current height span includes a Multicast and Broadcast Services (MBS) configuration according to the current height span.

5. The method of claim 1, wherein the method further comprises,
transmitting, to an Access and Mobility management Function (AMF), a registration request message including information on the current height span.

6. The method of claim 5, wherein the method further comprises,
receiving, from the AMF, a registration accept message including a new configuration for the current height span.

7. The method of claim 6,
wherein the new configuration includes a Non-Access-Stratum (NAS) configuration or an Access-Stratum (AS) configuration related to the current height span.

8. The method of claim 6,
wherein the new configuration includes a slice priority or slice group priority information applicable for the current height span.

9. The method of claim 1, wherein the tracking area update procedure comprises,
transmitting, to an AMF, a TRACKING AREA UPDATE REQUEST message including information on the height of the wireless device; and
receiving, from the AMF, a TRACKING AREA UPDATE ACCEPT message.

10. The method of claim 1,
wherein the wireless device is in communication with at least one of a user equipment, a network, or an autonomous vehicle other than the wireless device.

11. A wireless device comprising:
a transceiver;
a memory; and
at least one processor operatively coupled to the transceiver and the memory, and-adapted to perform operations, the operations comprising:
receiving information related to one or more threshold heights between a plurality of height spans;
monitoring a height of the wireless device;
determining a current height span among the plurality of height spans based on the height of the wireless device;
applying a configuration associated with the current height span,
wherein the configuration associated with the current height span includes a network slice configuration according to the current height span; and
initiating a tracking area update procedure based on the height of the wireless device being passed the one or more threshold heights.

12. The wireless device of claim 11, wherein the at least one processor is further configured to,
initiate the tracking area update procedure based on a height span of the wireless device being changed.

13. The wireless device of claim 11,
wherein the configuration associated with the current height span includes a IP Multimedia Subsystem (IMS) configuration according to the current height span.

14. A non-transitory computer-readable medium having stored thereon a plurality of instructions, which, when executed by a processor of a wireless device, perform operations, the operations comprising:
receiving information related to one or more threshold heights between a plurality of height spans;
monitoring a height of the wireless device;
determining a current height span among the plurality of height spans based on the height of the wireless device;
applying a configuration associated with the current height span,
wherein the configuration associated with the current height span includes a network slice configuration according to the current height span; and
initiating a tracking area update procedure based on the height of the wireless device being passed the one or more threshold heights.

\* \* \* \* \*